US008135406B2

(12) United States Patent
Wijayanathan et al.

(10) Patent No.: US 8,135,406 B2
(45) Date of Patent: Mar. 13, 2012

(54) METHODS AND APPARATUS FOR USE IN CONTROLLING THE SELECTION OF COMMUNICATION NETWORKS WHILE CONNECTED IN A GENERIC ACCESS NETWORK

(75) Inventors: Maiyuran Wijayanathan, Waterloo (CA); Noushad Naqvi, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 729 days.

(21) Appl. No.: 12/134,462

(22) Filed: Jun. 6, 2008

(65) Prior Publication Data
US 2009/0005033 A1    Jan. 1, 2009

Related U.S. Application Data

(60) Provisional application No. 60/942,724, filed on Jun. 8, 2007.

(51) Int. Cl.
*H04W 4/00* (2009.01)
(52) U.S. Cl. .................................... 455/435.2
(58) Field of Classification Search .... 455/435.1–435.3, 455/434; 370/338
See application file for complete search history.

(56) References Cited

U.S. PATENT DOCUMENTS

| | | | | |
|---|---|---|---|---|
| 6,987,985 | B2* | 1/2006 | Purkayastha et al. | 455/552.1 |
| 7,167,707 | B1* | 1/2007 | Gazzard et al. | 455/434 |
| 7,280,826 | B2* | 10/2007 | Nylander et al. | 455/433 |
| 7,283,507 | B2* | 10/2007 | Buckley et al. | 370/338 |
| 7,457,621 | B2* | 11/2008 | Zhang | 455/435.2 |
| 7,706,793 | B2* | 4/2010 | Zhang | 455/435.2 |
| 7,742,765 | B2* | 6/2010 | Israelsson et al. | 455/436 |
| 2004/0192291 | A1* | 9/2004 | Shaheen et al. | 455/426.1 |
| 2004/0192295 | A1* | 9/2004 | Tsao et al. | 455/432.1 |
| 2005/0153684 | A1* | 7/2005 | Rodrigo | 455/411 |
| 2005/0195762 | A1 | 9/2005 | Longoni et al. | |
| 2005/0233727 | A1 | 10/2005 | Poikselka et al. | |
| 2006/0094427 | A1* | 5/2006 | Buckley et al. | 455/434 |
| 2006/0116125 | A1* | 6/2006 | Buckley et al. | 455/435.1 |

(Continued)

FOREIGN PATENT DOCUMENTS
WO    2005048632 A1    5/2005
(Continued)

OTHER PUBLICATIONS

Change Request (CR) 0013, Rev. 1, To Specification 43.318, QUALCOMM Europe, TSG-GERAN #29 San Jose Del Cabo, Mexico, Apr. 24-28, 2006, pp. 1-4.

(Continued)

*Primary Examiner* — Lester Kincaid
*Assistant Examiner* — Nathan Mitchell
(74) *Attorney, Agent, or Firm* — John J. Oskorep, Esq.

(57) ABSTRACT

A mobile device maintains a communication link with a radio access network (RAN) which is part of a generic access network (GAN). The mobile device maintains, via the GAN, a serivce connection for a voice and/or data service with a core network of a visited Public Land Mobile Network (PLMN). The mobile device operates to set and run a timer and, in response to an expiration of the timer, the mobile device sends, to a gateway controller via the RAN, a service conneciton request for a service connection with a core network of a home PLMN of the mobile device. If the service connection request is accepted, the mobile device operates to establish and maintain, via the GAN, a service connection with the core network of the home PLMN for communications.

17 Claims, 6 Drawing Sheets

U.S. PATENT DOCUMENTS

| | | | |
|---|---|---|---|
| 2006/0166699 A1* | 7/2006 | Aghvami et al. | 455/552.1 |
| 2006/0234705 A1 | 10/2006 | Oommen et al. | |
| 2006/0245392 A1* | 11/2006 | Buckley et al. | 370/331 |
| 2007/0004404 A1* | 1/2007 | Buckley et al. | 455/434 |
| 2007/0072595 A1 | 3/2007 | Pi et al. | |
| 2007/0099632 A1 | 5/2007 | Choksi | |
| 2007/0129078 A1 | 6/2007 | De Beer | |

FOREIGN PATENT DOCUMENTS

| | | | |
|---|---|---|---|
| WO | 2006047862 A1 | 5/2006 | |
| WO | 2006056070 A1 | 6/2006 | |
| WO | 2007096685 A1 | 8/2007 | |

OTHER PUBLICATIONS

3GPP TS 23.122, 3rd Generation Partnership Project; Technical Specification Group Core Network and Terminals; Non-Access-Stratum(NAS) Functions Related to Mobile Station (MS) in Idle mode, Version 6.5.0, pp. 1-34, Jun. 2005.

3GPP TS 43.318, 3rd Generation Partnership Project; Technical Specification Group GSM/Edge Radio Access Network; Generic Access to the A/Gb Interface; Stage 2, Version 6.5.0, pp. 1-70, Jan. 2006.

International Preliminary Report on Patentability, PCT application # PCT/CA2008/001091, Jun. 6, 2008.

3rd Generation Partnership Project; Technical Specification Group Services and System Aspects; Voice Call Continuity between CS and IMS; Stage 2 (Release 7); 3GPP TS 23.206, 2006.

Extended European search report, Jun. 9, 2010, EP patent application # 08757223.6.

3GPP TS 23. 122, "3rd Generation Partnership Project; Technical Specification Group Core Network; NAS Functions Related to Mobile (MS) in Idle Mode (Release 5)", vol. 5.3.0, Date Sep. 2003, pp. 1-34, Sophia Antipolis Valbonne France.

3GPP TS 43.318, "3rd Generation Partnership Project; Technical Specification Group GSM/Edge Radio Access Network; Generic Access to the A/Gb Interface; Stage 2 (Release 6)", vol. 6.6.0, Date Apr. 2006, pp. 1-70, Sophia Antipolis Valbonne France.

International Search Report and Written Opinion—PCT/CA2008/001091—Oct. 2, 2008.

* cited by examiner

METHODS AND APPARATUS FOR USE IN CONTROLLING THE SELECTION OF COMMUNICATION NETWORKS WHILE CONNECTED IN A GENERIC ACCESS NETWORK

CROSS-REFERENCE TO RELATED APPLICATION

This application is a non-provisional patent application claiming priority to a U.S. provisional patent application entitled "METHODS AND APPARATUS FOR USE IN CONTROLLING THE SELECTION OF COMMUNICATION NETWORKS WHILE CONNECTED IN A GENERIC ACCESS NETWORK" having application No. 60/942,724 and filing date of 8 Jun. 2007, which is hereby incorporated by reference herein.

BACKGROUND

1. Field of the Technology

The present disclosure relates generally to methods and apparatus for controlling the selection of communication networks for communications for mobile communication devices.

2. Description of the Related Art

The present disclosure generally pertains to methods and apparatus for controlling the selection of communication networks for communications for mobile communication devices, and in the specific embodiments pertains to methods and apparatus for controlling the selection of communication networks for mobile communication devices adapted to operate in both wireless local area networks (WLANs) (e.g. IEEE 802.11-based networks) and wireless wide area networks (WWLANs) (e.g. cellular telecommunication networks or Public Land Mobile Networks (PLMNs), having a generic access network (GAN) mode of operation where access to the core network of the PLMN is achieved via the WLAN through a GAN controller (GANC) or the like.

Conventional functionality related to the techniques of the present disclosure is defined by and documented in standard 3GPP TS 43.318 v6.6.0 (2006-04), 3$^{rd}$ Generation Partnership Project; Technical Specification Group GSM/EDGE Radio Access Network; Generic access to the A/Gb interface; Stage 2 (Release 6). In such standard, particular with reference to section 8.2, it is indicated that there shall be no change from the PLMN selection procedures in the non-access stratum (NAS) layers (MM and above) in the mobile station with the exception that, in GAN mode, the visited PLMN (VPLMN) background scan shall be disabled.

However, there is a need for improved control over the selection of communication networks for communications for mobile communication devices.

BRIEF DESCRIPTION OF THE DRAWINGS

Embodiments of present disclosure will now be described by way of example with reference to attached figures, wherein:

FIG. 5 illustrates a second state of the communication system from previous FIG. 4, where a service connection is established and maintained, via the GAN, with a core network associated with a home PLMN of the mobile communication device; and FIG. 6 illustrates a third state of the communication system from previous FIG. 4, where wireless communications and a service connection is established and maintained, via the WWAN with use of a WWAN radio interface, with the home or other more suitable PLMN of the mobile communication device.

DETAILED DESCRIPTION OF THE PREFERRED EMBODIMENTS

Figure 1:
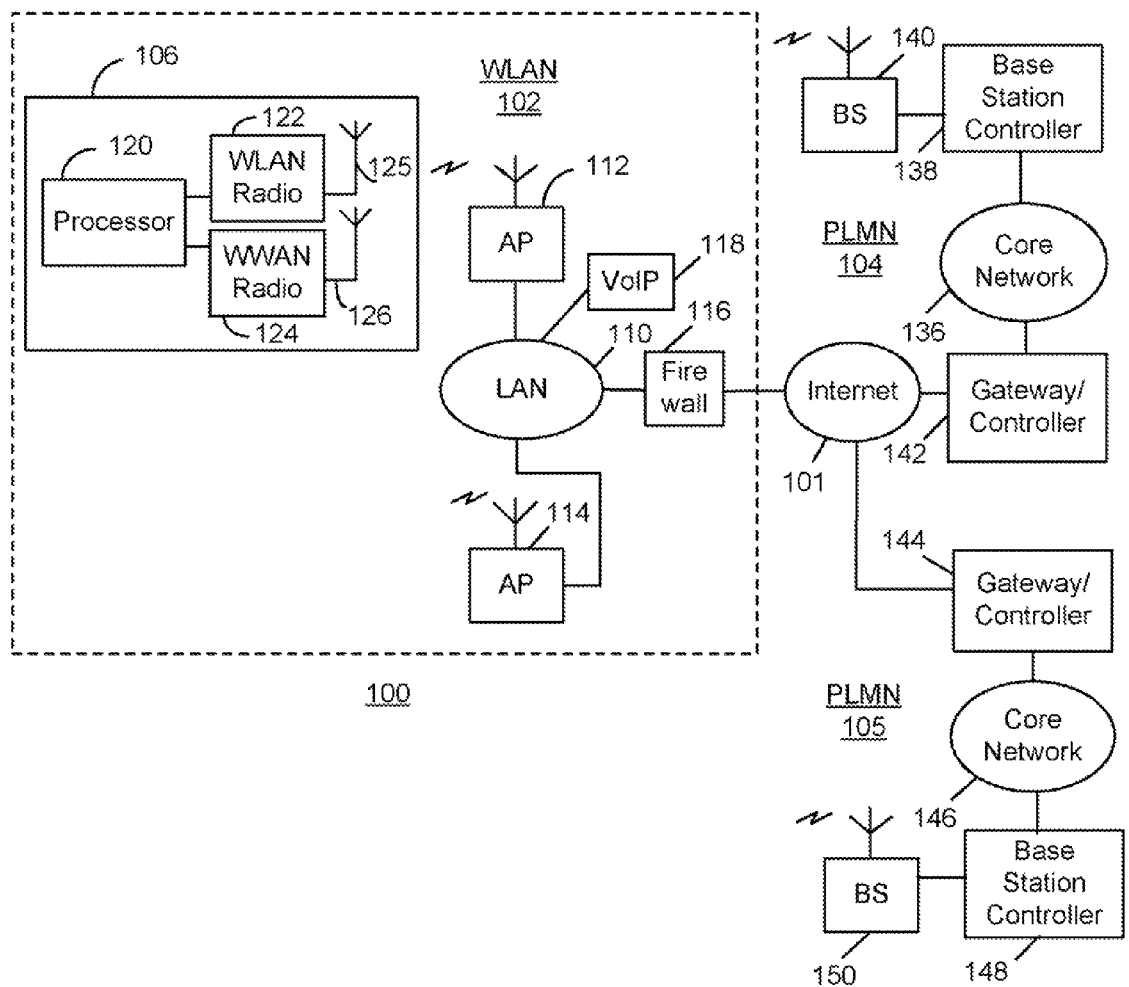
FIG. 1 is an illustrative representation of a communication system comprising a radio access network (RAN), which may be a wireless local area network (WLAN) such as an IEEE 802.11-based wireless network, which is part of a Generic Access Network (GAN), as well as a wireless wide area network (WWAN) such as a cellular telecommunications network.

It has been identified that the suggestions or mandates described in the relevant standard documentation may be too limiting, and may negatively impact the user from the perspective of roaming charges, for example. As a result, methods and apparatus for use by a mobile communication device in controlling the selection of a communication network for communications are described herein. Thus, methods and apparatus for use by a mobile communication device in controlling the selection of a communication network for communications are provided herein. In one illustrative embodiment, the mobile device maintains a communication link with a radio access network (RAN), which may be a wireless local area network (WLAN) such as an IEEE 802.11-based wireless network. The radio access network is considered part of a generic access network (GAN) which also includes a gateway controller. The mobile device maintains, via the generic access network, a service connection with a core network associated with a visited Public Land Mobile Network (PLMN) of the mobile device for communications. The service connection may be or include a voice connection for voice service, a data connection for data service, or both. The mobile device repeatedly performs actions while the service connection with the core network associated with the visited PLMN is maintained through the generic access network. Specifically, the mobile device operates to set and run a timer and, in response to an expiration of the timer, the mobile device sends, to a gateway controller via the radio access network, a service connection request for a service connection with a core network of a home PLMN of the mobile device. If the service connection request is accepted, the mobile device operates to establish and maintain, via the generic access network, a service connection with the core network associated with the home PLMN for communications. If this service connection request is not accepted, however, the mobile device preferably operates to select an alternative visited PLMN from a preferred list of visited networks, if the alternative visited PLMN has a higher priority in the list than the visited PLMN. In this case, the mobile device sends, to a gateway controller through the radio access network, a service connection request for a service connection with a core network of the alternative visited PLMN. If the service connection request for the service connection to the alternative visited PLMN is accepted, the mobile device operates to establish and maintain a service connection with the alternative visited PLMN for communications. If the service connection is not accepted, however, the mobile device may continue to maintain the service connection with the core network associated with the visited PLMN, resetting and running the timer. Optionally, if the service connection is not accepted, the mobile device may operate to send, via a WWAN radio interface, a service connection request for a service connection with the home or other more suitable PLMN. If the service connection request for the service connection to the home PLMN sent via the WWAN radio interface is accepted, the mobile device operates to establish and maintain a service connection with the home or other more suitable PLMN via the WWAN radio interface for communications.

To help further illustrate, FIG. 1 is an illustrative representation of a communication system 100 which includes a wireless local area network (WLAN) 102 and a public land mobile network (PLMN) 104. WLAN 102 is one type of radio access network (RAN) which is part of a Generic Access Network (GAN) utilized by a communication device 106. Having one or more base stations and base station controllers, PLMN 104 may be or be referred to as a wireless wide area network (WWAN) or a mobile telecommunications network which may be further utilized by communication device 106.

In the embodiment described, WLAN 102 is an IEEE 802.11-based wireless network. WLAN 102 may be part of a communication network such as a local area network (LAN) 110. In this embodiment, LAN 110 is part of a private communication network, which may be an enterprise network of an enterprise having a gateway 116 including a firewall. Alternatively, LAN 110 may be a public communication network which may not require any gateway. Terminals may connect to LAN 110 through any suitable means, such as through a plurality of wireless access points (APs) (e.g. APs 112 and 114) of WLAN 102. Such mobile communication devices and wireless APs can operate in accordance with IEEE 802.11 standards.

LAN 110, which includes WLAN 102, provides various local data and communication services to its terminals. For example, LAN 110 may provide for voice telephony communication services for its terminals with use of Voice over IP (VoIP) communications. For such services, LAN 110 may utilize servers such as a VoIP type server 118 or at least one session server which is a session initiation protocol (SIP) server. Communication applications, such VoIP applications, may require the use of SIP. SIP is well-documented in standard documents such as Request For Comments (RFC) 3261.

PLMN 104 includes a core network 136, a plurality of base station controllers such as a base station controller (BSC) 138 coupled to core network 136, and a plurality of base stations such as a base station (BS) 140 coupled to associated BSCs 138. Core network 136, BSC 138, and BS 140 operate in a conventional fashion as well-documented. Other PLMNs in the environment have a similar or the same architecture as PLMN 104, such as a PLMN 105 having a core network 146, a plurality of base station controllers such as a base station controller (BSC) 148, a plurality of base stations such as a base station (BS) 150) coupled to associated BSCs 148, and a gateway/controller 144 provided between the Internet 101 and core network 146.

In this example, communication device 106 of LAN 110 is shown as a mobile communication device/wireless handset (WH) of the dual-mode type, having both WLAN and WWAN radio interfaces. In particular, communication device 106 is shown to have one or more processors 120, a WLAN radio interface 122, a WWAN radio interface 124, and antenna components 125 and 126 coupled to radio interfaces 122 and 124. Thus, communication device 106 may access services of core network 136 of PLMN 104 with use of WWAN radio interface 124, as well as access services of LAN 110 with use of WLAN radio interface 122.

Communications between LAN 110 and core network 136 of PLMN 104 may be facilitated through a suitable connecting network such as a broadband, wide-area IP communication network (e.g. the Internet 101) or any suitable public or private wide area network. Gateway/controller 142 is provided between the Internet 101 and core network 136 of PLMN 104 in order to facilitate access to core network 136 by terminals through alternative links (e.g. radio links wireless APs 112 and 114) different than those conventional radio links offered in the PLMN 104 (e.g. radio links of base station 140). Thus, communication device 106 may also access services of core network 136 of PLMN 104 via WLANs, such as WLAN 102, through use of WLAN radio interface 122. For such communications, gateway/controller 142 and communication device 106 are adapted to establish and maintain a (secure) tunnel connection between each other through the intervening networks. Note that WLAN 102 may be operator-controlled or provided (e.g. controlled or provided by the operator associated with PLMN 104), user-controlled or provided (e.g. controlled or provided by the end user of communication device 106), or third-party-controlled or provided.

Preferably, gateways/controllers 142/144 operate in accordance with Generic Access Network (GAN) based technology (formerly known as Unlicensed Mobile Access (UMA)), and may be or include a GAN Controller (GANC) (formerly known as UMA Network Controller or UNC) or the like. In this case, terminals including communication device 106 are enabled with GAN technology for operating in a GAN mode of operation.

Communication device 106 with GAN-enabled, dual-mode operation (e.g. communication device 106) may be within operating range of WLAN 102 for communications. Upon connecting, communication device 106 contacts gateway/controller 142 (e.g. the GANC), via WLAN 102 and the Internet 101, to be authenticated and authorized to access voice and data communication services of core network of PLMN 104. If approved, the subscriber's current location information is stored in core network 136 of PLMN 104 and, from that point on, all voice and data traffic for communication device 106 is routed to the device via WLAN 102, in contrast to being routed through traditional radio access technologies of PLMN 104 which includes BSC 138 and BS 140. In this state, communication device 106 is operating in a GAN mode of operation. When a call is established for communication device 106 while operating within WLAN 102, the call connection for the call is routed within core network 136 but RF resources of WLAN 102 are utilized. When communication device 106 moves outside the range of WLAN 102, communication device 106 and gateway/controller 142 help facilitate a roaming to the licensed outdoor network (e.g. the RAN of PLMN 104). When camping on the RAN of PLMN 104, communication device 106 is operating in a WWAN mode of operation.

In this embodiment specifically, WLAN 102 is operable as a broadband IP-based access network providing access to the interfaces of PLMN 104, wherein gateway/controller 142 is a network node coupled to WLAN 102 via an Up reference point interface. These interfaces may be A/Gb interfaces for a GSM environment, or Iu-cs/Iu-ps interfaces for a UMTS environment, as examples. See e.g. Third Generation Partnership Project (3GPP) Technical Specification (TS) 43.318. As provided for in such specification documents, the Up reference point defines the interface between gateway/controller 142 and communication device 106. Where the WLAN 102 and gateway/controller 142 are operable to co-exist with the GSM/Enhanced Data Rates for GSM Evolution (EDGE) RAN (GERAN) infrastructure, gateway/controller 142 interconnects to the core network 136 of PLMN 104 via the same A/Gb interfaces used by a standard GERAN Base Station Subsystem (BSS) network element. Accordingly, the functionality of gateway/controller 142 includes necessary protocol interworking so as to emulate the functionality of the GERAN BSS. An A-interface defines the interface for GSM-based circuit-switched (CS) services and is disposed between gateway/controller 142 and a Mobile Switching Center (MSC) of PLMN 104. A Gb-interface defines the interface for GPRS-based packet-switched (PS) services and is disposed between gateway/controller 142 and Serving GPRS Support Node (SGSN) (not shown in FIG. 1) of PLMN 104. A Security Gateway (SGW) may also be included in GANC that is interfaced via a Wm reference point with an Authentication, Authorization and Accounting (AAA) proxy/server node disposed in PLMN 104, wherein a Home Location Register (HLR) is operably coupled to AAA node.

In operation, WLAN 102 and gateway/controller 142 appear to core network 136 of PLMN 104 as a GERAN BSS network element by mimicking the role of the BSC in the GERAN architecture as seen from the perspective of the A/Gb interfaces. Accordingly, transparency exists between core network 136 of PLMN 104 and the underlying radio access technologies supported by gateway/controller 142, which are different from the radio access supported by BSC 138. As described earlier, WLAN 102 is disposed between generic access (GA)-enabled communication device 106 and gateway/controller 142 may be effectuated by a suitable broadband IP network 101. The overall functionality provided by gateway/controller 142 includes user plane circuit-switched (CS) services, user plane packet-switched (PS) services, and control plane functionality. User plane CS services typically involve interworking CS bearers over the Up interface to CS bearers over the A-interface, including appropriate transcoding of voice to/from UE and PCM voice from/to the MSC. The user plane PS services typically involve interworking data transport channels over the Up interface to packet flows over the Gb interface. The control plane functionality typically includes (i) SGW for the set-up of secure tunnel with UE for mutual authentication, encryption and data integrity; (ii) registration for GAN service access and providing system information, (iii) set-up of GAN bearer paths for CS and PS services (e.g. establishment, management, and teardown of signaling and user plane bearers between communication device 106 the gateway/controller 142); and (iv) GAN functional equivalents to GSM paging and handovers.

Note that the description of the architecture for FIG. 1 relates to a specific example for illustration, where the WLAN is an IEEE 802.11-based network and the WWAN is a cellular telecommunications network. The WLAN and WWAN may be networks different from those networks, where, for example, the WLAN network covers a smaller region relative to the WWAN network. Specifically, the WLAN may be a Bluetooth-based network, a WiMAX-based network (i.e. IEEE 802.16), or a Ultra-WideBand (UWB)-based network (i.e. IEEE 802.15), as a few examples. WWAN networks may be, as examples, a Long-Term Evolution (LTE)-based network, an EVolution-Data Only (EV-DO)-based network, or a UMTS-based network.

Figure 2:
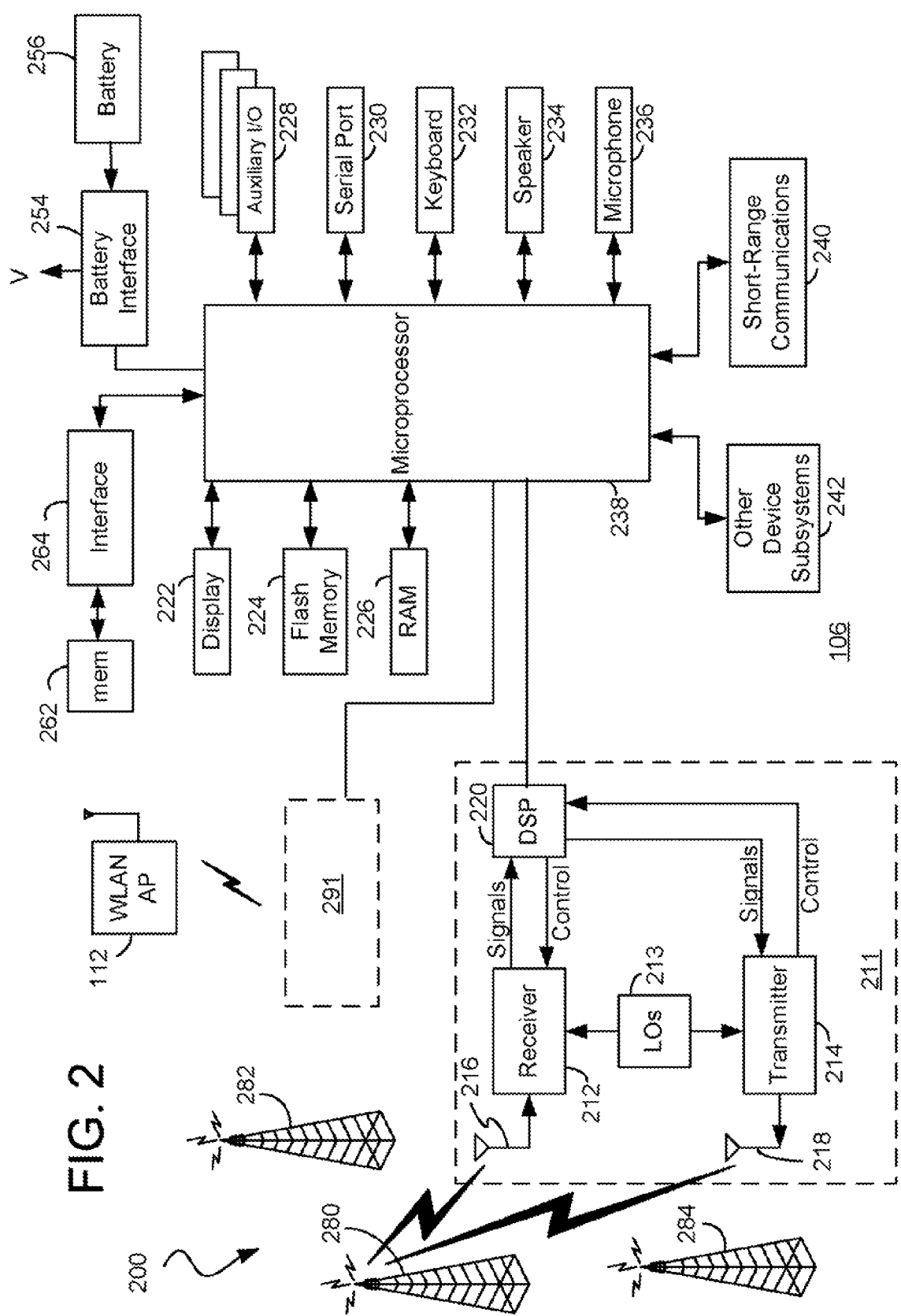
FIG. 2 is a schematic diagram of a mobile communication device (e.g. a handheld wireless handset) which may operate in both the WLAN and the WWAN of FIG. 1.

Referring now to FIG. 2, electrical components of a typical mobile communication device 106 (e.g. a wireless handset, a mobile station) which operates in a wireless network environment which includes both WLANs (represented in FIG. 2 by AP 112) and WWANs/PLMNs (represented in FIG. 2 by cellular base stations 200 which include stations 280, 282, and 284) are now described. Mobile device 106 may be representative of one or more terminals which operate in communication system 100 of FIG. 1. Mobile device 106 is preferably a two-way communication device having at least voice and advanced data communication capabilities, including the capability to communicate with other computer systems. Depending on the functionality provided by mobile device 106, it may be referred to as a data messaging device, a two-way pager, a cellular telephone with data messaging capabilities, a wireless Internet appliance, or a data communication device (with or without telephony capabilities).

As shown in FIG. 2, mobile device 106 is adapted to wirelessly communicate with cellular base stations 200. For communication with cellular base stations 200, mobile device 106 utilizes a communication subsystem 211 which includes RF transceiver circuitry. Communication subsystem 211 includes a receiver 212, a transmitter 214, and associated components, such as one or more (embedded or internal) antenna elements 216 and 218, local oscillators (LOs) 213, and a digital signal processor (DSP) 220. The specific design of communication subsystem 211 depends on the communication network in which mobile device 106 is intended to operate. In the present application, communication subsystem 211 (including its associated processor/processing components) are operative in accordance with a cellular or other suitable WWAN standards (i.e. a standard other than IEEE 802.11), such as GSM/GPRS standards.

Mobile device 106 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Mobile device 106 also has a communication subsystem 291 which includes RF transceiver circuitry operative in accordance with a suitable WLAN standard, such as the IEEE 802.11 standard, for communications with WLANs (e.g. represented by AP 112 in FIG. 2). Communication subsystem 291 is similar in structure and functionality to communication subsystem 211, where DSP 220 may be replaced with a processing module referred to as a baseband (BB) and media access control (MAC) module. Although mobile device 106 may have separate and independent subsystems for these purposes, at least some portions or components of these otherwise different subsystems may be shared where possible. Communication subsystem 291 may be referred to as a Generic Access Network (GAN) module or controller. As mobile device 106 operates in accordance with both a cellular network interface standard (e.g. GSM/GPRS standard) and the IEEE 802.11 standard, it may be referred to as a "dual mode" mobile device.

Since mobile device 106 may be a handheld, portable, battery-powered device, it also includes a battery interface 254 for receiving one or more rechargeable batteries 256. Such a battery 256 provides electrical power to most if not all electrical circuitry in mobile device 106, and battery interface 254 provides for a mechanical and electrical connection for it. Battery interface 254 is coupled to a regulator (not shown in FIG. 2) that provides a regulated voltage V to all of the circuitry.

Mobile device 106 includes a microprocessor 238 (one type of processor or controller) that controls overall operation of mobile device 106. This control includes the network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Specific device applications, or parts thereof, may be temporarily loaded into a volatile store such as RAM 226.

Microprocessor 238, in addition to its operating system functions, preferably enables execution of software applications on mobile device 106. A predetermined set of applications that control basic device operations, including at least data and voice communication applications, will normally be programmed and/or installed on mobile device 106 during its manufacture (including the network selection control techniques of the present disclosure). A preferred application that may be loaded onto mobile device 106 may be a personal information manager (PIM) application having the ability to organize and manage data items relating to user such as, but not limited to, e-mail, calendar events, voice mails, appointments, and task items. Naturally, one or more memory stores are available on mobile device 106, and memory 262 (designed as "mem" in FIG. 2) such as a subscriber identity module (SIM) or the like coupled via an interface 264 is used to facilitate storage of PIM data items and other user information.

The PIM application preferably has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 106 with respect to such items. This can be especially useful where the host computer system is the wireless device user's office computer system. Additional applications may also be loaded onto mobile device 106 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 106 and may provide enhanced on-device functions, communication-related functions, or both. For example, secure communication applications may enable electronic commerce functions and other such financial transactions to be performed using mobile device 106.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 106 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 106 is substantially similar, except that the received signals would be output to speaker 234 and signals for transmission would be generated by microphone 236. Alternative voice or audio I/O subsystems, such as a voice message recording subsystem, may also be implemented on mobile device 106. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 106 by providing for information or software downloads to mobile device 106 other than through a wireless communication network. The alternate download path may, for example, be used to load an encryption key onto mobile device 106 through a direct and thus reliable and trusted connection to thereby provide secure device communication. Short-range communications subsystem 240 of FIG. 2 is an additional optional component that provides for communication between mobile device 106 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 106 has just been described, any suitable mobile communication device or terminal may be part of the disclosed methods and apparatus which will be described in fuller detail below.

As described earlier above, the present disclosure pertains to methods and apparatus for controlling the selection of communication networks for mobile communication devices adapted to operate in both WLANs (e.g. IEEE 802.11-based networks) and WWANs (e.g. cellular telecommunication networks or Public Land Mobile Networks (PLMNs), having a GAN mode of operation where access to the core network of the PLMN is achieved via the WLAN with use of GAN controller (GANC) or the like. Conventional functionality related to the techniques of the present disclosure is defined by and documented in standard 3GPP TS 43.318 v6.6.0 (2006-04), $3^{rd}$ Generation Partnership Project; Technical Specification Group GSM/EDGE Radio Access Network; Generic access to the A/Gb interface; Stage 2 (Release 6). In such standard, particular with reference to section 8.2, it is indicated that there shall be no change from the PLMN selection procedures in the non-access stratum (NAS) layers (MM and above) in the mobile station with the exception that, in GAN mode, the visited PLMN (VPLMN) background scan shall be disabled. However, it has been identified that the suggestions or mandates described in the relevant standard documentation (standard 3GPP TS 43.318 v6.6.0 (2006-04)) may be too limiting, and may negatively impact the user from the perspective of roaming charges, for example.

Figure 3:
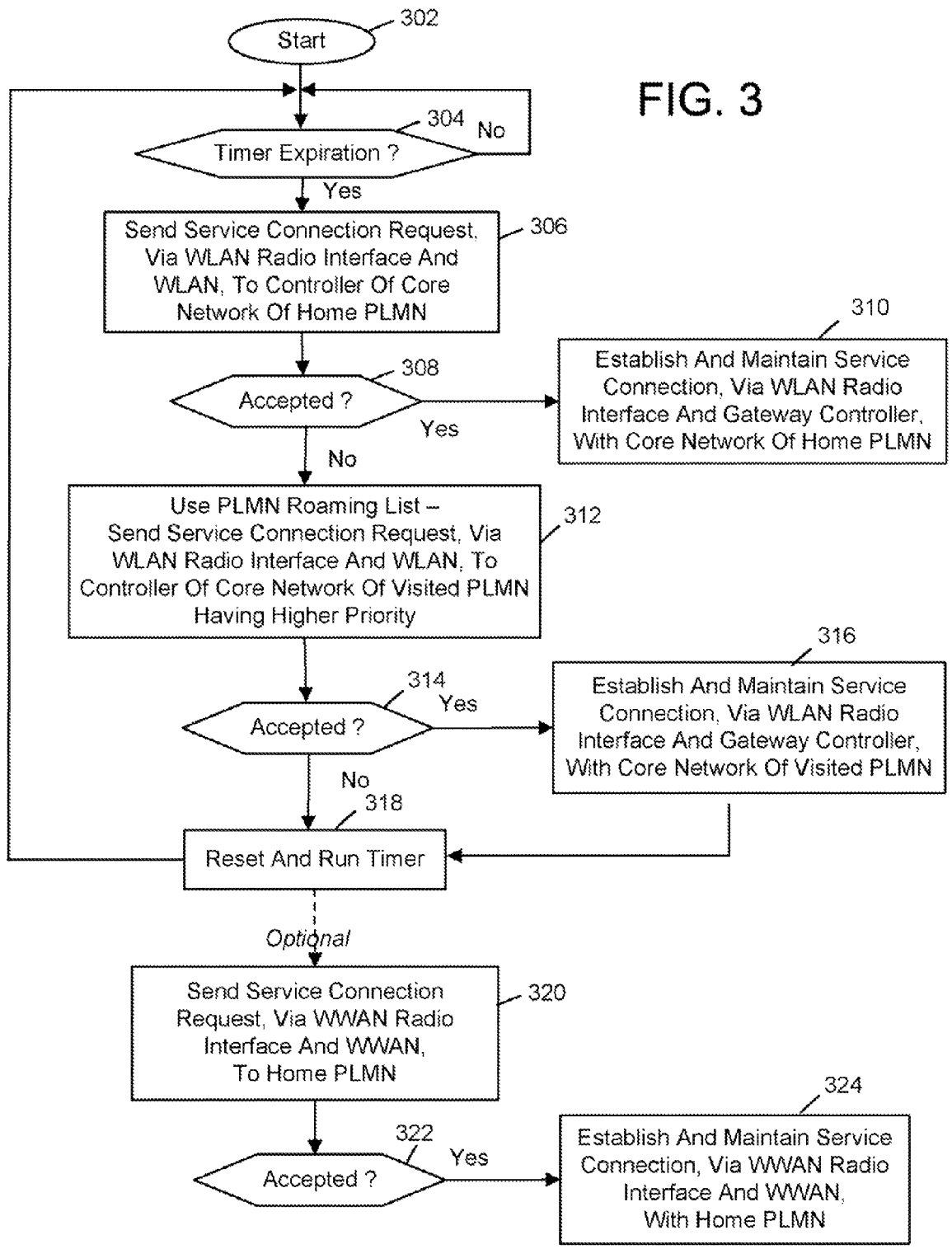
FIG. 3 is a flowchart which describes a method of controlling the selection of communication networks in the environment of FIG. 1.

FIG. 3 is a flowchart which describes a method of controlling the selection of communication of networks by a mobile communication device, such as mobile communication device 106 in the environment of FIG. 1. As apparent, the embodiments of the present disclosure are directed to a specific example where the WLAN is an IEEE 802.11-based network and the WWAN is a cellular telecommunications network. However, the WLAN and WWAN may be networks different from those networks, as long as the specific WLAN network covers a smaller region relative to the specific WWAN network. Specifically, for example, one of the networks may be a Bluetooth-based network, and the other network may be a cellular network or an IEEE 802.11-based network. Also, for example, one of the networks may be a WiMAX network, and the other network may be a cellular network or an IEEE 802.11-based network. Further, the technique described assumes that the communication device is a mobile communication device of the dual-mode type, having both WLAN and WWAN radio interfaces. In an alternative embodiment, however, mobile communication device 106 may have only a single (radio) interface for access (e.g. only WLAN radio interface 122) and operates accordingly without the other interface.

The technique may be embodied in a mobile communication device having one or more processors, a WLAN (radio) interface adapted to communicate via the WLAN, and a WWAN (radio) interface adapted to communicate via the WWAN. The technique may also be embodied in a computer program product which includes a computer readable medium and computer instructions stored in the computer readable medium which execute the method.

Figure 5:
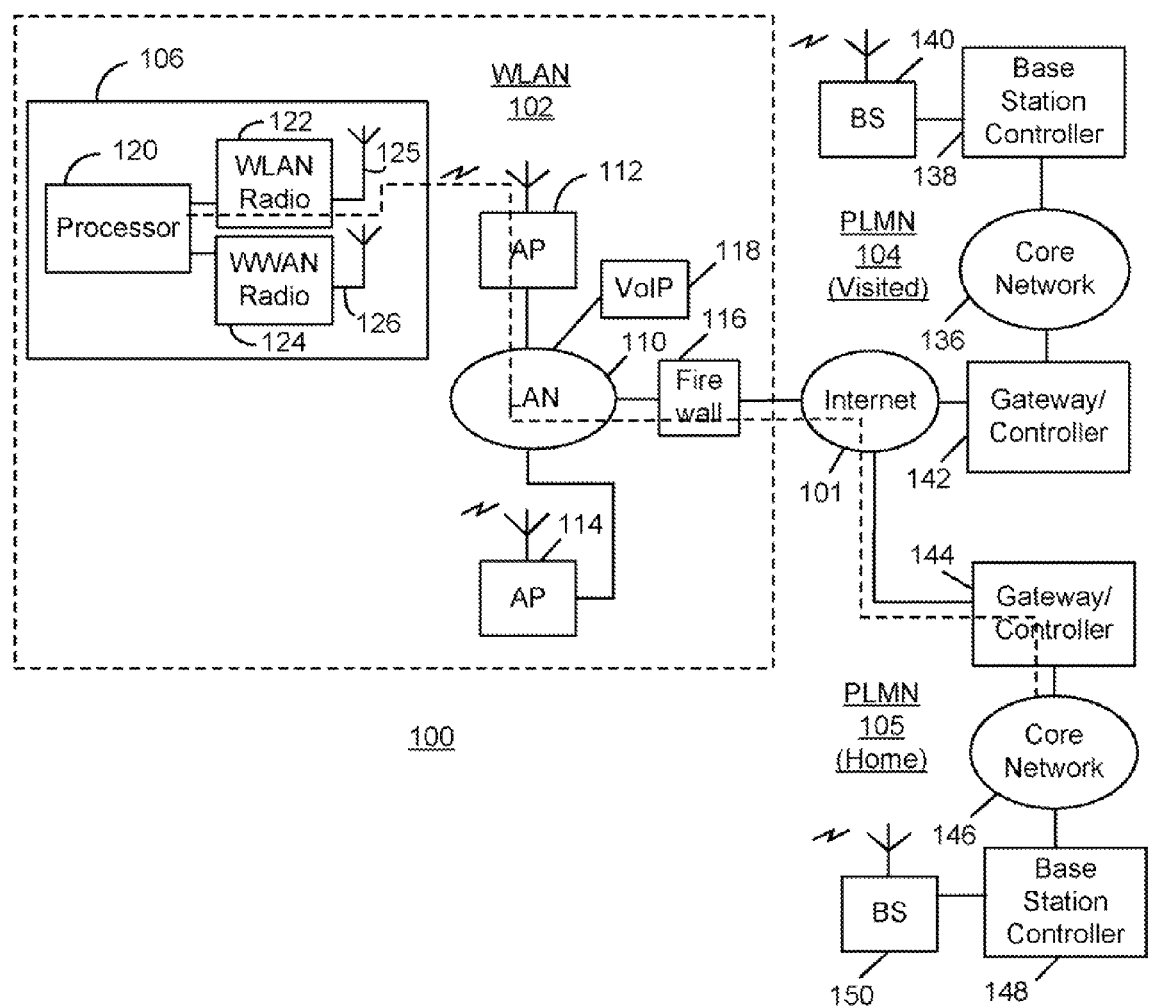
Figure 6:
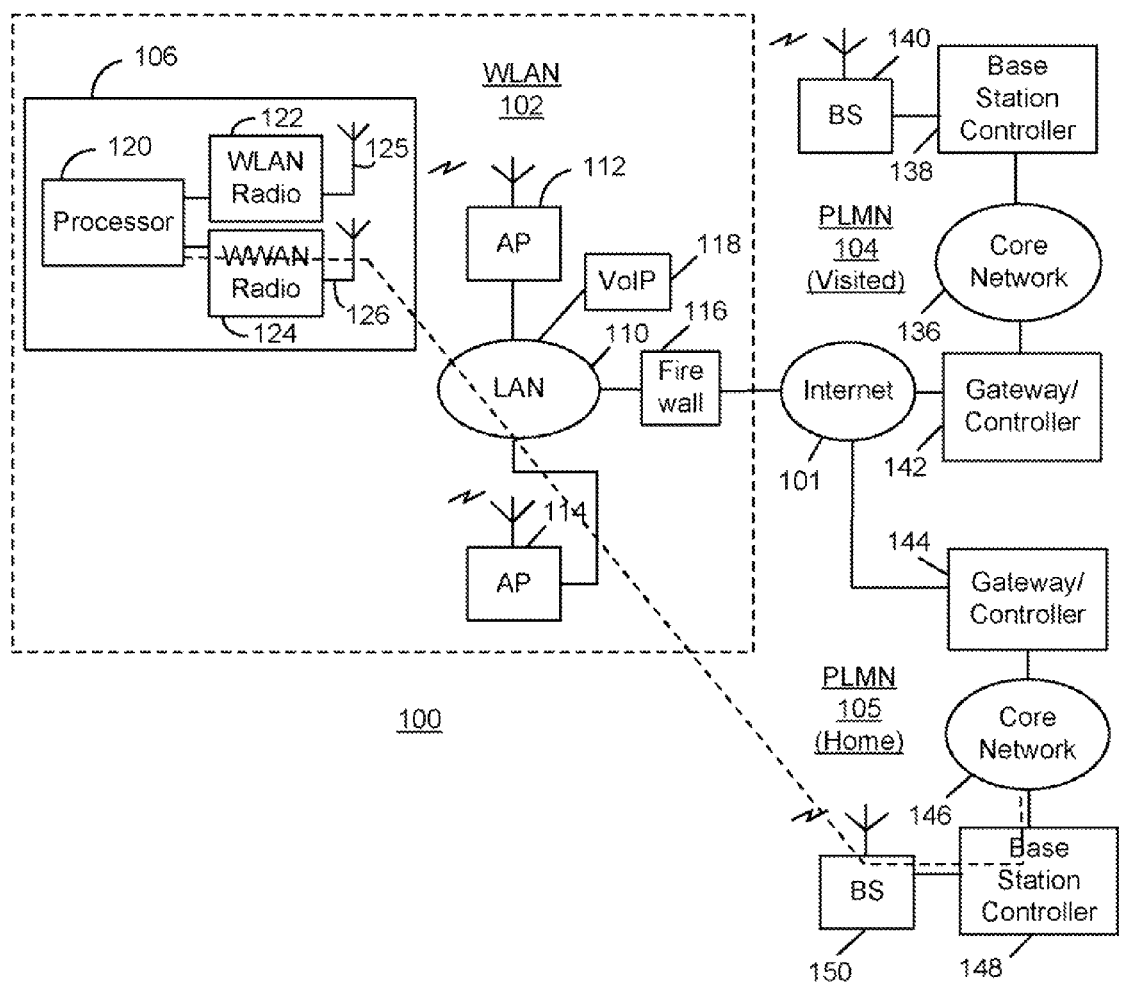

The flowchart of FIG. 3 will be described in combination with the system diagrams presented in sequential order in FIGS. 4-6 with respect to the flowchart of FIG. 3. Note that, in this example, PLMN 105 is a home network of mobile communication device 106, whereas PLMN 104 is a visited or roaming network of mobile communication device 106.

Referring first to FIG. 3, mobile communication device 106 operates its WLAN radio interface 122 to select, establish, and maintain a wireless communication link with wireless AP 112 of WLAN 102. To do this, mobile communication device 106 has access to a preferred or prioritized list of WLANs (and/or user profile) maintained in its memory for use in selecting the most preferred WLAN available in its current location or geographic coverage region for network access.

At this time, mobile communication device 106 also operates to establish and maintain a service connection (e.g. a voice connection associated with a voice service, and/or a data connection associated with a data service), through WLAN 102 and the Internet 101, with a core network associated with a PLMN. In particular, mobile communication device 106 first attempts to establish a service connection with core network 146 of home PLMN 105. If the home network or services thereof are not accepted or unavailable, however, mobile communication device 106 establishes a service connection with a core network associated with a visited PLMN. Such result is shown in FIG. 4, where mobile communication device 106 has a service connection maintained with core network 136 associated with visited PLMN 104. The services made available by core network 136 of visited PLMN 104 may be or include communication services such as voice, data, electronic mail (e-mail), Web browsing, etc. Mobile communication device 106 has access to a preferred or prioritized list of roaming (visited) PLMNs maintained in its memory for use in selecting the most preferred available PLMN when the home PLMN (i.e. PLMN 105) and/or service(s) thereof are unavailable. Thus, visited PLMN 104 may have been selected for service as the best available network at the time of initial access by mobile communication device 104, where home PLMN 104 or services thereof were unavailable.

Figure 4:
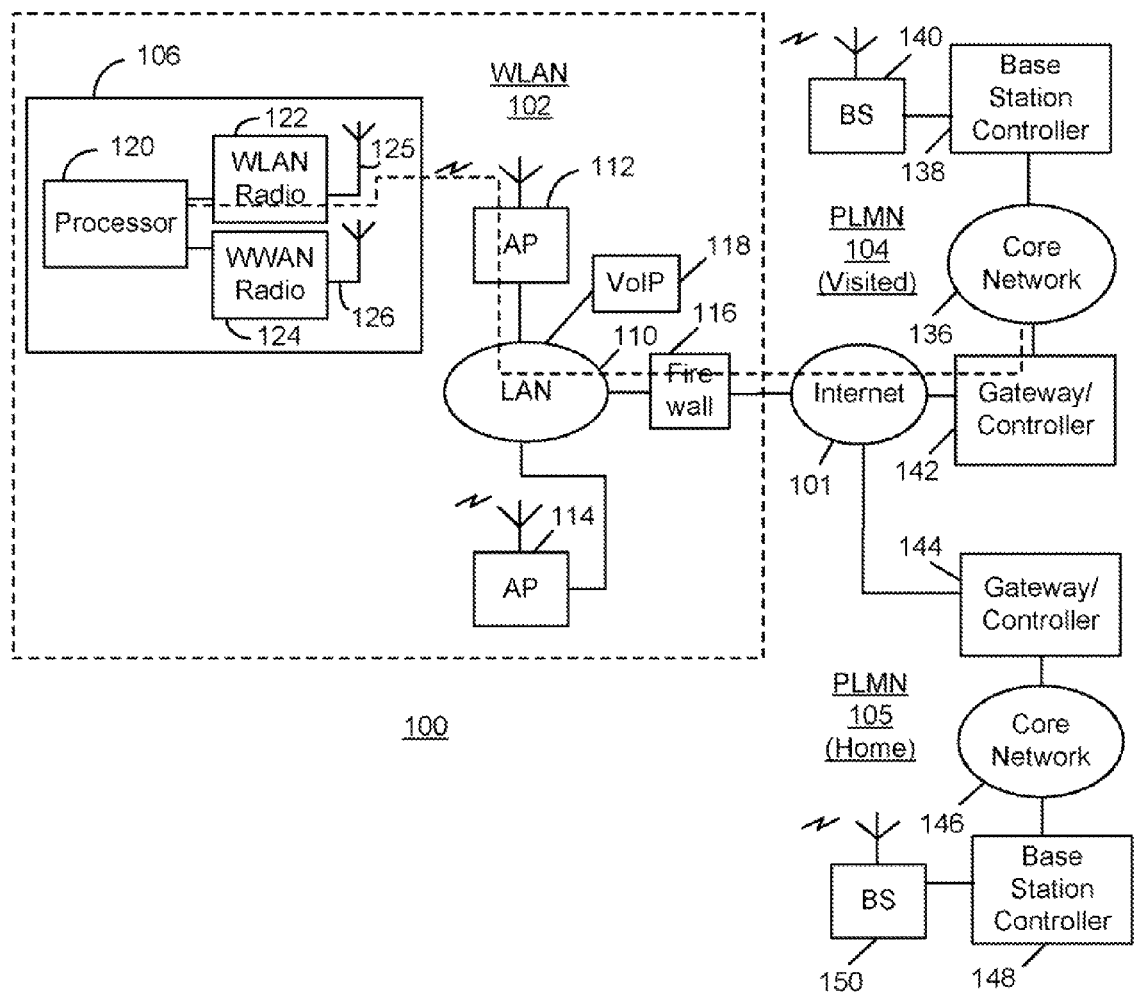
FIGS. 4-6 are illustrations of the communication system of FIG. 1 presented in a sequence according to possibilities of the flowchart of FIG. 3, where in FIG. 4 a first state is represented where a service connection is established and maintained, via the GAN, with a core network associated with a visited PLMN of the mobile communication device.

Referring now to the flowchart of FIG. 3 in combination with FIG. 4, while the service connection is maintained with the core network 136 associated with the visited PLMN 104 in FIG. 4, mobile communication device 106 operates to repeatedly perform certain actions. In particular, mobile communication device 106 operates to set and run a timer. The timer may be a periodic timer (e.g. between 5-10 minutes), or increase over time. The timer may be, or be referred to as, a home PLMN timer or PLMN timer. In response to each expiration of the timer (step 304 of FIG. 3), mobile communication device 106 sends, via WLAN 102 using WLAN radio interface 122, a service connection request for a service connection with core network 146 associated with home PLMN 105 (step 306 of FIG. 3). If the service connection request is accepted ("YES" branch of step 308 in FIG. 3), mobile communication device 106 operates to establish and maintain, via WLAN 102 using WLAN radio interface 122, a service connection with the core network 146 associated with home PLMN 105 for communications (step 310 of FIG. 3). This result is shown in FIG. 5. The services made available by core network 146 of home PLMN 105 may be or include communication services such as voice, data, electronic mail (e-mail), Web browsing, etc., and be more preferred or useful than those offered by visited PLMN 104.

However, the service connection request for the service connection with core network 146 of home PLMN 105 might not be accepted ("NO" branch in step 308 of FIG. 3). The home PLMN may not be found, communications may fail, and/or services may be denied or otherwise unavailable. In this case, mobile communication device 106 operates to select another, different visited PLMN (not shown in FIGS. 3-6) from the preferred or prioritized list of roaming (visited) PLMNs which has a higher priority in the list than the current, serving visited PLMN 104 (step 312 of FIG. 3). After selection, mobile communication device operates to send, via WLAN 102 with use of WLAN radio interface 122, a service connection request for a service connection with a core network of this selected, higher-priority, visited PLMN. If accepted ("YES" branch in step 314 of FIG. 3), mobile communication device 106 operates to establish and maintain, via WLAN 102 using WLAN radio interface 122, a service connection with the core network associated with the higher-priority visited PLMN for communications (step 316 of FIG. 3). If not accepted in step 314, a new selection and request is performed again for any additional higher-priority, visited PLMNs provided in the preferred or prioritized list of roaming (visited) PLMNs in a repeated fashion. (Note that the flowchart of FIG. 3 merely assumes, for simplicity, that a higher-priority visited PLMN is found and available.) After establishing and maintaining the service connection with the core network associated with the higher-priority visited PLMN in step 316, or if no other higher-priority visited PLMNs are available or accept in step 314, the timer is reset and run again (step 318 of FIG. 3), and the method repeats as indicated.

However, the service connection requests for the service connections with the core networks of the PLMNs via the WLAN might not be accepted. The home and visited PLMNs (or associated core networks) may not be found, communications may fail, and/or services may be denied or otherwise unavailable. In this case (i.e. optionally from step 318 of FIG. 3), mobile communication device 106 may operate to send, via WWAN radio interface 124, a service connection request for a service connection with home PLMN 105 (step 320 of FIG. 3) or other more preferred PLMN. Prior to such action, mobile communication device 106 may perform a scanning operation with use of WWAN radio interface 124 to identify PLMNs (e.g. home PLMN 105) available within its RF coverage region. If the service connection request for the service connection to the home PLMN 105 sent via WWAN radio interface 124 is accepted ("YES" branch in step 322 of FIG. 3), mobile communication device 106 operates to establish and maintain a service connection with home PLMN 105 for communications via WWAN radio interface 124 (step 324 of FIG. 3). This result is shown in FIG. 6. Again, the services made available by home PLMN 105 may be or include communication services such as voice, data, electronic mail (e-mail), Web browsing, etc., and be more preferred or useful than those offered by visited PLMN 104.

Again, it has been identified that the suggestions or mandates described in the relevant standard documentation (standard 3GPP TS 43.318 v6.6.0 (2006-04)) may be too limiting, and may negatively impact the user from the perspective of roaming charges, for example. As a result, methods and apparatus for use by a mobile communication device in controlling the selection of communication networks for communications have been provided as described herein.

In one illustrative example, the mobile device maintains a communication link with a radio access network. The radio access network may be part of a generic access network (GAN) which includes a gateway controller. The mobile device maintains, via the generic access network, a service connection with a core network of a visited Public Land Mobile Network (PLMN) for communications. The mobile device repeatedly performs actions while the service connection with the core network associated with the visited PLMN is maintained via the generic access network. Specifically, the mobile device operates to set and run a timer and, in response to an expiration of the timer, the mobile device sends, to a gateway controller via the radio access network, a service connection request for a service connection with a core network of a home PLMN of the mobile device. If the service connection request is accepted, the mobile device operates to establish and maintain, via the generic access network, a service connection with the core network of the home PLMN for communications. If this service connection request is not accepted, however, the mobile device operates to select an alternative visited PLMN from a preferred list of visited networks, if the alternative visited PLMN has a higher priority in the list than the visited PLMN. In this case, the mobile device sends, to a gateway controller through the radio access network, a service connection request for a service connection with a core network of the alternative visited PLMN.

In one embodiment, the radio access network may be or include a wireless local area network (WLAN) which operates in accordance with IEEE 802.11 standards. Other suitable alternative networks may be utilized. The WLAN may be a Bluetooth-based network, a WiMAX-based network (i.e. IEEE 802.16), or a Ultra-WideBand (UWB)-based network (i.e. IEEE 802.15), as a few examples. WWAN networks may be, for example, a Long-Term Evolution (LTE)-based network, a EVolution-Data Only (EV-DO)-based network, or a UMTS-based network. The technique may be embodied in a mobile communication device having one or more processors adapted to execute the technique. The technique may also be embodied in a computer program product having a computer readable medium and computer instructions stored in the computer readable medium, where the one or more processors are operative to execute the computer instructions in accordance with the method.

The above-described embodiments of the present application are intended to be examples only. Those of skill in the art may affect alterations, modifications and variations to the particular embodiments without departing from the scope of the application. The embodiments described herein in the recited claims intend to cover and embrace all suitable changes in technology.

What is claimed is:

1. A method for use by a mobile communication device in controlling the selection of a communication network for communications, the method comprising:
   maintaining a communication link with a radio access network, the radio access network being part of a generic access network which further includes a gateway controller;
   maintaining, via the generic access network, a service connection with a core network of a visited Public Land Mobile Network (PLMN) for communications;
   repeatedly performing the following acts while the service connection is maintained, via the generic area network, with the core network of the visited PLMN for communications:
      setting and running a timer;
      in response to an expiration of the timer:
         sending, via the radio access network, a service connection request for a service connection with a core network of a home PLMN of the mobile communication device; and
         determining if the service connection request has been accepted, and if the service connection request is determined to have been accepted: establishing and maintaining, via the generic access network, a service connection with the core network of the home PLMN for communications.

2. The method of claim 1, wherein the generic access network comprises a wireless local area network (WLAN) and the communication link comprises a wireless communication link maintained with the wireless local area network (WLAN) via a WLAN radio interface of the mobile communication device, and the method further comprises:
   repeatedly performing the following additional acts while the service connection is maintained, through the WLAN, with the core network of the visited PLMN:
      if the service connection request for the service connection with the core network of the home PLMN is determined to not have been accepted: sending, via a wireless wide area network (WWAN) radio interface, a service connection request for a data connection with the home PLMN; and if the service connection request for the service connection to the home PLMN sent via the WWAN radio interface is determined to have been accepted: establishing and maintaining a service connection with the home PLMN via the WWAN radio interface for communications.

3. The method of claim 1, wherein the visited PLMN is a first visited PLMN and the method comprises:
repeatedly performing the following additional acts while the service connection is maintained, via the generic access network, with the core network of the visited PLMN:
if the service connection request for the service connection with the core network of the home PLMN is determined to not have been accepted: if a second visited PLMN from a preferred list of visited PLMNs has a higher priority in the preferred list than the first PLMN, selecting the second visited PLMN from the preferred list and sending, via the radio access network, a service connection request for a service connection with a core network of the second PLMN.

4. The method of claim 1, wherein the radio access network comprises a wireless local area network (WLAN), the communication link comprises a wireless communication link maintained with the WLAN via a WLAN radio interface of the mobile communication device, and the visited PLMN is a first visited PLMN, the method further comprising:
repeatedly performing the following additional acts while the service connection is maintained, via the generic access network, with the core network of the first visited PLMN for communications:
if the service connection request for the service connection to the home PLMN sent via the WLAN radio interface is determined to not have been accepted: if a second visited PLMN from a preferred list of visited PLMNs has a higher priority in the preferred list than the first visited PLMN, selecting the second visited PLMN from the preferred list and sending, via the WLAN radio interface, a service connection request for a service connection with a core network of the second visited PLMN; and
if the service connection request for the service connection with the core network of the second visited PLMN is determined to not have been accepted: sending, via a wireless wide area network (WWAN) radio interface of the mobile communication device, a service connection request for a service connection with the home PLMN and, if the service connection request for the service connection to the home PLMN sent via the WWAN radio interface is determined to have been accepted, establishing and maintaining a service connection with the home PLMN via the WWAN radio interface for communications.

5. The method of claim 1, wherein the radio access network comprises a wireless local area network (WLAN), the communication link comprises a wireless communication link maintained with the WLAN via a WLAN radio interface of the mobile communication device, and the visited PLMN is a first visited PLMN, the method further comprising:
repeatedly performing the following additional acts while the service connection is maintained, via the generic access network, with the core network of the first visited PLMN for communications:
if the service connection request for the service connection to the home PLMN sent via the WLAN radio interface is determined to not have been accepted: if a second visited PLMN from a preferred list of visited PLMNs has a higher priority in the preferred list than the first visited PLMN, selecting the second visited PLMN from the preferred list and sending, via the WLAN radio interface, a service connection request for a service connection with a core network of the second visited PLMN.

6. The method of claim 1, wherein the radio access network comprises a wireless local area network (WLAN) and the communication link comprises a wireless communication link maintained with the wireless local area network (WLAN) via a WLAN radio interface of the mobile communication device.

7. The method of claim 1, wherein the radio access network comprises a network selected from the list consisting of: a Bluetooth-based network, an IEEE 802.11-based network, and a WiMAX network.

8. The method of claim 1, wherein the radio access network comprises an IEEE 802.11-based network.

9. A computer program product, comprising:
a non-transitory computer readable medium;
computer instructions stored on the computer readable medium; and
the computer instructions being executable by one or more processors of a mobile communication device for:
maintaining a communication link with a radio access network, the radio access network being part of a generic access network which further includes a gateway controller;
maintaining, via the generic access network, a service connection with a core network of a visited Public Land Mobile Network (PLMN) for communications;
repeatedly performing the following acts while the service connection is maintained, via the generic area network, with the core network of the visited PLMN for communications:
setting and running a timer;
in response to an expiration of the timer:
sending, via the radio access network, a service connection request for a service connection with a core network of a home PLMN of the mobile communication device; and
determining if the service connection request has been accepted, and if the service connection request is determined to have been accepted, then establishing and maintaining, via the generic access network, a service connection with the core network of the home PLMN for communications.

10. A mobile communication device comprising:
one or more processors;
a Radio Access Network (RAN) interface, the RAN interface being coupled to the one or more processors and configured to communicate with a RAN which is part of a generic access network (GAN) which further includes a gateway controller;
a wireless wide area network (WWAN) radio interface, the WWAN radio interface being coupled to the one or more processors and configured to provide for communications via Public Land Mobile Networks (PLMNs);
the one or more processors being configured to establish and maintain, with use of the RAN interface, a communication link with the RAN;
the one or more processors being further configured to establish and maintain, via the RAN interface and the GAN, a service connection with a core network of a visited PLMN for communications;

the one or more processors being further configured to repeatedly perform the following acts while the service connection is maintained, through the RAN interface and the GAN, with the core network of the visited PLMN:
set and run a timer;
in response to an expiration of the timer:
send, via the RAN interface and the GAN, a service connection request for a service connection with a core network of a home PLMN of the mobile communication device; and
determine if the service connection request has been accepted, and if the service connection request is determined to have been accepted: establish and maintain, via the RAN interface and the GAN, a service connection with the core network of the home PLMN for communications.

11. The mobile communication device of claim 10, wherein the RAN interface comprises a wireless local area network (WLAN) radio interface configured for communications with a WLAN, and the one or more processors are further configured to:
repeatedly perform the following additional acts while the service connection is maintained, through the WLAN radio interface and the WLAN, with the core network of the visited PLMN for communications:
if the service connection request for the service connection with the core network of the home PLMN through the WLAN is determined to not have been accepted: send, via the WWAN radio interface, a service connection request for a service connection with the home PLMN; and
if the service connection request for the service connection to the home PLMN sent via the WWAN radio interface is determined to have been accepted: establish and maintain a service connection with the home PLMN via the WWAN radio interface for communications.

12. The mobile communication device of claim 10, wherein the visited PLMN is a first visited PLMN and the one or more processors are further configured to:
repeatedly perform the following additional acts while the service connection is maintained, through the RAN interface and the GAN, with the core network of the first visited PLMN:
if the service connection request for the service connection with the core network of the home PLMN through the RAN is determined to not have been accepted: if a second visited PLMN from a preferred list of visited networks has a higher priority in the preferred list than the first visited PLMN, select the second visited PLMN from the preferred list and send, through the RAN interface and the GAN, a service connection request for a service connection with a core network of the second visited PLMN.

13. The mobile communication device of claim 10, wherein the one or more processors are further configured to send the service connection request by sending the service connection request to Generic Access Network Controller (GANC) for the home PLMN.

14. The mobile communication device of claim 10, wherein the radio access network comprises a wireless local area network (WLAN) and the communication link comprises a wireless communication link maintained with the wireless local area network (WLAN) via a WLAN radio interface of the mobile communication device.

15. The mobile communication device of claim 10, wherein the radio access network comprises a network selected from the list consisting of: a Bluetooth-based network, an IEEE 802.11-based network, and a WiMAX network.

16. The mobile communication device of claim 10, wherein the radio access network comprises an IEEE 802.11-based network, and the home and the visited PLMNs comprise cellular telecommunication networks.

17. A method for use by a mobile communication device configured for communications in accordance with $3^{rd}$ Generation Partnership Project (3GPP) standards, the method comprising:
maintaining a wireless communication link with a radio access network (RAN), the RAN being an IEEE 802.11 network;
maintaining, over the wireless communication link with the RAN and via a generic access network (GAN) which includes the RAN, a service connection with a core network of a visited Public Land Mobile Network (PLMN) for communications;
repeatedly performing the following acts while the service connection is maintained via the GAN with the core network of the visited PLMN:
setting and running a timer;
in response to an expiration of the timer:
sending, over the wireless communication link with the RAN, a service connection request for a service connection with a core network of a home PLMN (HPLMN); and
determining if the service connection request has been accepted, and if the service connection request is determined to have been accepted, then establishing and maintaining via the GAN a service connection with the core network of the HPLMN for communications.

* * * * *